(12) United States Patent
Pearlstein (10) Patent No.: US 6,469,744 B1
(45) Date of Patent: Oct. 22, 2002

(54) METHODS AND APPARATUS FOR ENCODING, DECODING AND DISPLAYING IMAGES IN A MANNER THAT PRODUCES SMOOTH MOTION

(75) Inventor: Larry Pearlstein, Newtown, PA (US)

(73) Assignee: Hitachi America, Ltd., Tarrytown, NY (US)

( * ) Notice: Subject to any disclaimer, the term of this patent is extended or adjusted under 35 U.S.C. 154(b) by 0 days.

(21) Appl. No.: 09/347,906

(22) Filed: Jul. 6, 1999

(51) Int. Cl.$^7$ ................................................. H04N 3/27

(52) U.S. Cl. ...................................... 348/554; 348/497

(58) Field of Search ................................ 348/554–558, 348/441–459, 725, 607, 910, 497

(56) References Cited

U.S. PATENT DOCUMENTS

| | | | | |
|---|---|---|---|---|
| 5,111,292 A | * | 5/1992 | Kuriacose et al. | 358/133 |
| 5,400,077 A | * | 3/1995 | Cookson et al. | 348/556 |
| 5,742,349 A | * | 4/1998 | Choi et al. | 348/443 |
| 5,767,917 A | * | 6/1998 | Gornstein | 348/543 |
| 6,005,546 A | * | 12/1999 | Keene | 345/154 |
| 6,118,486 A | * | 9/2000 | Reitmeier | 348/441 |
| 6,122,433 A | * | 9/2000 | McLaren | 386/68 |
| 6,222,589 B1 | * | 4/2001 | Faroudja et al. | 348/448 |
| 6,295,090 B1 | * | 9/2001 | Voltz et al. | 348/441 |
| 6,297,852 B1 | * | 10/2001 | Laksono et al. | 348/584 |

OTHER PUBLICATIONS

"ATSC Digital Television Standard", Doc. A/53, Advanced Television Systems Committee (Sep. 16, 1995), pp. 167.

"Information Technology—Generic Coding of Moving Pictures and Associated Audio", Recommendation H.262 ISO/IEC 13818–2, International Organisation for Standardization ISO/IEC JTC1/SC29 (Nov. 1993), pp. I–176.

* cited by examiner

Primary Examiner—Victor R. Kostak
(74) Attorney, Agent, or Firm—Straub & Pokotylo; Michael P. Straub (57) ABSTRACT

Methods and apparatus for encoding, decoding and displaying images in a manner that provides for relatively smooth motion are described. In accordance with the invention a multi-sync display device is used and the refresh rate of the display device is controlled to minimize or avoid judder. Control of the display device refresh rate is performed in various embodiments, as a function of frame display, frame coding, field coding and/or image capture rate information included in an encoded bitstream. Alternatively, the refresh rate of a display is controlled as a function of decoding rate information or other information available from a decoder. In one exemplary embodiment, frames are displayed and the refresh rate of a display device is controlled to be an integral multiple of the indicated frame display rate included in an encoded bitstream. In accordance with an encoding feature of the present invention, refresh rate control information is included in an encoded video bitstream and used by a display system to control the refresh rate of a display device used to display images represented by the encoded video bitstream. The refresh rate control information is information which is not necessary for decoding but useful in achieving high quality display of the images. In accordance with the refresh rate control methods of the invention, a display device's refresh rate may vary depending on the video being displayed.

45 Claims, 6 Drawing Sheets

METHODS AND APPARATUS FOR ENCODING, DECODING AND DISPLAYING IMAGES IN A MANNER THAT PRODUCES SMOOTH MOTION

FIELD OF THE INVENTION

The present invention relates to methods and apparatus for encoding, decoding and displaying images and, more particularly, to methods and apparatus for encoding, decoding and displaying images in a manner that provides relatively smooth motion.

BACKGROUND OF THE INVENTION

Video sequences comprise a series of images, e.g., frames. In the case of motion pictures, where film is used, each frame corresponds to a frame of film.

During filming, frames which are also sometimes called pictures, are captured at a pre-selected rate, e.g., 24 frames a second. The rate at which images are converted to frames, e.g., by the taking of a sequence of pictures, is refereed to as the image capture rate. When using rolls of film to show an image sequence, e.g., in a movie theater, pictures are normally displayed at the same rate at which they were initially captured. However, the shutter of the projector may be shuttered multiple times per picture display time to provide a flicker rate which is higher than the video capture rate. This is because higher flicker rates tend to be less annoying than lower flicker rates.

Significantly, in the case of film, pictures are normally displayed at a uniform rate which is usually a function of the picture capture rate. Thus, motion in film tends to be relatively smooth since each new picture corresponds to the same amount of time as the preceding picture.

The advent of television and, more recently, computers, has greatly expanded the number of devices which use media other than film to store, transmit and display video images. Most television sets are capable of displaying images at a single rate determined by the television set's horizontal and vertical refresh rates. Computer display devices, e.g., multi-sync monitors, are frequently capable of responding to synchronization signals which may fall within a range of refresh rates supported by the monitor. As a result, multi-sync monitors are capable of supporting one or more display refresh rates while television sets usually support a single display refresh rate.

While video images are now commonly transmitted as analog signals, e.g., in the case of NTSC television, the use of digital data to represent video images is growing in popularity. For example, digital video disk players, digital satellite broadcasts to the home, and digital high definition television, currently rely on the transmission of video images as digital data.

A frame is generally used to describe a complete image, or an image composed of two interleaved fields, which are to be displayed on a display device. Frames may be coded as either progressive or interlaced images. In the case of progressive images, all of the lines of a frame are coded to be displayed in sequence. Thus, progressive frames may be coded so that the lines of the frame will be displayed in sequence starting at the top of a display screen and ending at the bottom of the display screen each time the display is refreshed. Interlaced frames normally comprise two fields, a first field corresponding to the even lines of a frame and a second field corresponding to the odd lines of a frame.

During display, the lines of the first field of an interlaced display are normally refreshed and then the lines of the second field are refreshed. In this manner, with each updating of an interlaced display, every other line of a frame is updated. In the case of non-film video sequences, the term picture is often used to refer to either a progressive frame or a field of an interlaced frame.

Various standards relating to the encoding and transmission of digital video signals now exist. One such standard is MPEG-2 which is described in detail in "INFORMATION TECHNOLOGY—GENERIC CODING OF MOVING PICTURES AND ASSOCIATED AUDIO", Recommendation H.262 ISO/IEC 13818-2, published by INTERNATIONAL ORGANISATION FOR STANDARDIZATION ISO/IEC JTC1/SC29 (Nov. 1993).

Frames of a video sequence are normally encoded and then transmitted to a destination device once. While encoded frames are usually transmitted only once, frames or fields of a frame may be displayed repeatedly. Since frames tend to be encoded and decoded on average at a rate corresponding to the rate at which the original images were collected, the rate at which digitally represented video frames are encoded or decoded over a period of time normally corresponds to, or matches, the image capture rate. The rate at which frames are coded is sometimes referred to as the coded frame rate.

The MPEG-2 standard provides for a frame rate indicator in the encoded bitstream. The frame rate indicator provides the "indicated frame rate", i.e., the rate at which frames are to be displayed. Significantly, MPEG-2, as well as other digital video standards, allows for the actual number of coded frames per second, which is coded and transmitted as part of a digital bitstream, to differ from the indicated frame rate specified by the frame rate indicator which is included in the bitstream. Normally, discrepancies between the coded frame rate and the indicated frame rate are resolved through the use of a field or frame repeat mechanism, e.g., one or more field or frame repeat commands included in a transmitted bitstream. MPEG-2 supports a repeat_first_field decoder instruction.

Frequently, an encoded bitstream's indicated frame display rate differs from the actual coded frame rate. This is because video images which are captured using a first media, e.g., film, are often subsequently coded for display using a different media, e.g., analog or digital television. The frequent discrepancy between indicated and coded frame rates is not surprising given the large number of possible frame rates. Consider for example, the ATSC Digital Television Standard, described in "ATSC DIGITAL TELEVISION STANDARD", Doc. A/53, published by the Advanced Television Systems Committee (Sep. 16, 1995) which is based in part on the MPEG-2 standard. The ATSC standard permits a plurality of indicated frame rates to be supported including 23.976 Hz, 24.000 Hz, 29.970 Hz, 30,000 Hz, 59.940 Hz, and 60.000 Hz. The actual coded frame rates may differ from any one of these indicated frame rates requiring the use of a repeat field or repeat frame operation to achieve the indicated frame rate at the time the video images are output for display.

Figure 2:
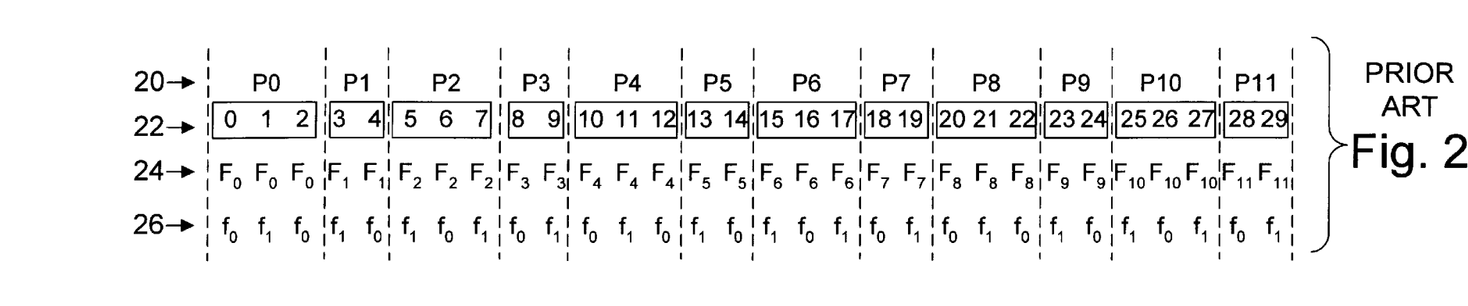
FIG. 2 illustrates a known method of representing and displaying a sequence of images.

One technique, often called the 3:2 pull down technique, for adapting film images recorded at 24 HZ to be displayed at 30 HZ is illustrated in FIG. 2. In the first row identified by reference numeral 20, film pictures 1–12 (P0–P11) corresponding to a one half second period of time, are shown. In the second row identified by reference numeral 22, numbers 0 through 29 are used to indicate the 30 fields which will be displayed in a half second period of time. A box is used in row 22 to group together fields which correspond to the same film picture. Note how, in row 22, three fields are displayed for every odd numbered film picture while two fields are displayed for every even numbered film picture. In row 4 of FIG. 2, indicated by reference numeral 24, a capital F is used to indicate a frame and the sub-script is used to indicate the number of the frame. Note how a total of 12 frames, $F_0$–$F_{11}$, are used to represent the 12 film pictures P0–P11. The fourth row of FIG. 2, indicated by reference numeral 26 shows the sequence of displayed fields. A review of row 26 shows how the third field displayed for each even numbered film picture, and thus even numbered frame, is a repeat of the first field while the first and second fields of even numbered film pictures are displayed only once. The field repetition rate illustrated in FIG. 2 may be achieved, e.g., by the inclusion of repeat_first_field commands in an encoded MPEG-2 bitstream.

In the FIG. 2 example, the coded frame rate is 24 frames per second while the indicated frame rated included in an encoded bitstream would be 30 frames/sec since 60 fields/sec are displayed in one time period as the result of the illustrated field repetition.

Note in FIG. 2 how even frames are displayed for three field times while odd frames are displayed for only two field times. Thus, even frames are displayed for longer periods of time than odd numbered frames. This has the unfortunate effect of giving the impression of jerky, as opposed to smooth, motion. This is due to the apparent speeding up and then slowing down of the displayed frames. The jerky motion resulting from the use of the repeat field or repeat frame command is sometimes called judder.

Judder is frequently apparent in images which are captured and/or coded at one rate and then displayed at another rate, e.g., at an indicated frame rate which differs from the captured or coded frame rate.

In known systems such as television sets, which use display devices that support only a single fixed refresh rate, video decoders normally pad the decoded video output signal by repeating fields or frames so that the video decoder output rate matches the video display device refresh rate. Thus, the actual displayed frame rate may differ from both the indicated frame display rate information included in the encoded bitstream and the image capture rate. Accordingly, in known systems with a single fixed display refresh rate, judder may result even when the indicated frame rate matches the image capture rate.

Figure 1:
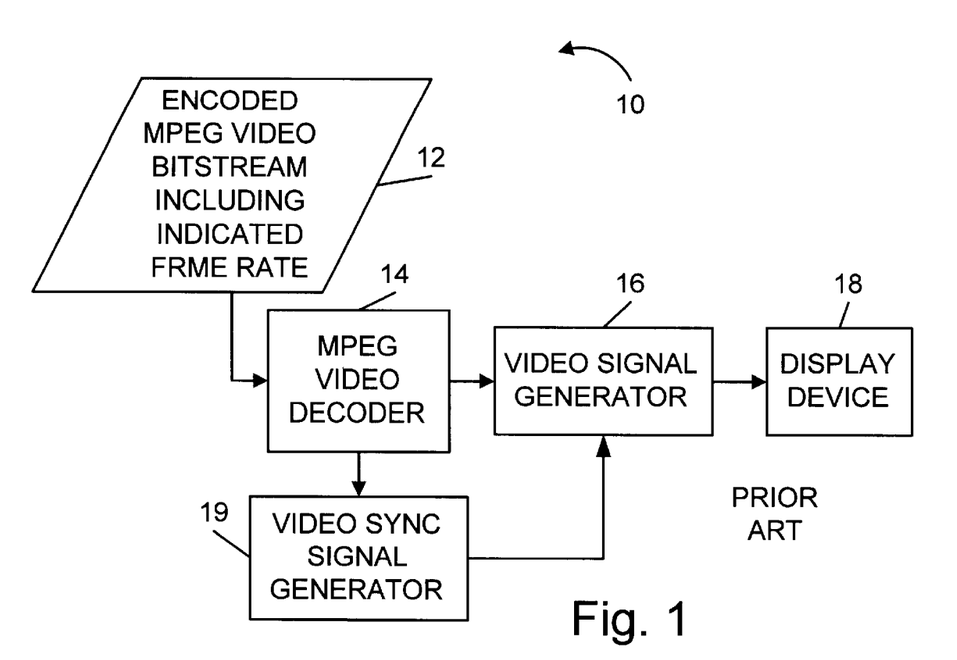
FIG. 1 illustrates a known video system for decoding and displaying interlaced frames.

FIG. 1 illustrates a known system 10, e.g., a digital television set, for decoding and displaying encoded MPEG video sequences. As illustrated, the system 10 comprises an MPEG video decoder 14, a video sync signal generator 19, a video signal generator 16 and a fixed rate display device 18.

The MPEG video decoder 14, receives the bitstream 12. The exemplary bitstream 12 includes, e.g., encoded frames, one or more repeat_first_field commands and an indicated frame rate. The MPEG video decoder 14 decodes the encoded bitstream 12 to generate therefrom, in the interlaced case, decoded frames comprising first and second fields. The video sync signal generator 19 generates vertical and/or horizontal sync signals which are used to control the refreshing of the display at the display's fixed refresh rate. The generating of the sync signals is synchronized with video decoder operation, e.g., through the use of timing information obtained from the encoded bitstream. The sync signals generated by the video sync signal generator 19, and the decoded image signals produced by the video decoder 14, are received and processed by the video signal generator 16.

As is known in the art, the video signal generator 16 converts digital signals input thereto into an analog signal format which is suitable for use by the display device 18. In cases where the video sync signals are incorporated into the video color image signals, it is the responsibility of the video signal generator 16 to combine the video color signals and sync signals prior to supplying them to the display device 18. In cases where the video and image signals are supplied to the display device 18 on separate lines, it is the responsibility of the video signal generator 16 to insure that both the synchronization signals and image signals are transmitted to the display device via an interface included in the video signal generator.

As discussed above, due to differences in the captured and/or coded frame rate and the displayed frame rate, judder may result in the known system. This can be annoying and, in many cases, noticeably degrades the quality of a displayed image sequence.

In view of the above discussion, it is apparent that there is a need for methods and apparatus for reducing and/or eliminating judder in displayed video sequences. For hardware compatibility reasons, it is desirable that any new methods not prevent the display of an encoded bitstream on an existing system which does not implement the methods and apparatus of the present invention.

SUMMARY OF THE PRESENT INVENTION

The present invention relates to methods and apparatus for reducing and/or eliminating judder in displayed images. In accordance with various features of the present invention, a multi-sync display device is used and the refresh rate of the display device is controlled to minimize or avoid judder. Control of the display device refresh rate is performed in various embodiments, as a function of frame display, frame coding, field coding and/or image capture rate information included in an encoded bitstream. Alternatively, the refresh rate of a display is controlled as a function of decoding rate information or other information available from a decoder.

In accordance with one exemplary embodiment of the present invention, frames are displayed and the refresh rate of a display device is controlled to be an integral multiple of the indicated frame display rate included in an encoded bitstream.

In accordance with another feature of the present invention, information is included in the encoded bitstream about the rate at which frames or fields are encoded and/or images are captured for encoding. This information may be expressed in terms of, a frame coding rate, a field coding rate, and/or an image capture rate which is included in an encoded bitstream.

By adjusting the refresh rate of a display to be an integer multiple of one of the above discussed rates, the display time for a series of frames can be adjusted so that sequential frames are displayed for the same amount of time thereby reducing or eliminating the above discussed problem of judder.

In one particular embodiment, information about the actual rate at which frames are being coded is added to the generated encoded bitstream. This data, referred to herein as "coded frame rate information" may be in addition to the conventional frame display rate information required, e.g., by various standards such as MPEG-2. The coded frame rate information may be included as user data in an MPEG-2 bitstream or as metadata in systems which support the use of such data. The term metadata is used here to describe data which is not necessary, but may be useful to, the decoding and/or display of encoded image data. Because metadata is not necessary to decode an image, it is sometimes called enhancement data.

In some embodiments, where coded frame rate information is not included in a bitstream, an estimate of the coded frame rate is determined via information, e.g., decoding frame rate information, obtained from the video decoder. In cases where indicated frame rate information is included in the encoded video bitstream, the indicated frame rate information may be used in combination with information obtained from the video decoder regarding field and/or frame repetition rates to determine the coded frame rate.

By controlling the refresh rate of a display device as a function of frame rate or image capture rate information and/or decoding frame rate information, the methods and apparatus of the present invention reduce and/or eliminate judder which would otherwise appear in many displayed video sequences.

Numerous additional features, embodiments and advantages of the methods and apparatus of the present invention are discussed below in the detailed description which follows.

DETAILED DESCRIPTION

As discussed above, the present invention relates to methods and apparatus for encoding, decoding and displaying images in a manner that provides relatively smooth motion thereby minimizing or avoiding judder.

Figure 4:
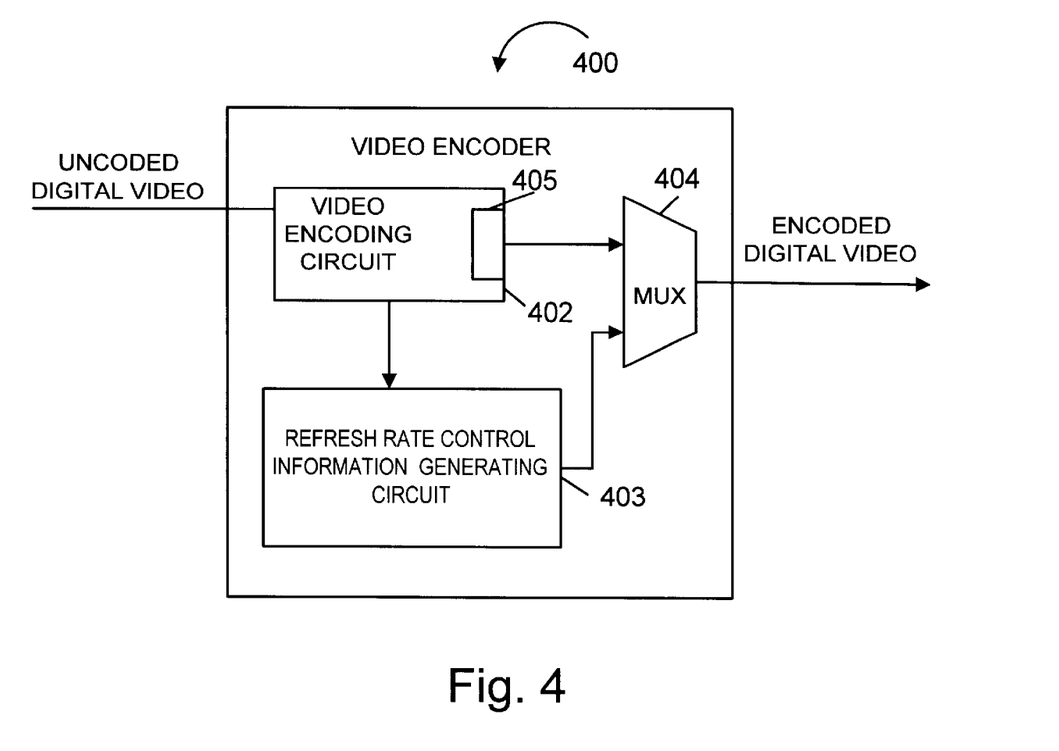
FIG. 4 illustrates a video encoder implemented in accordance with the present invention.

FIG. 4 illustrates a video encoder 400 implemented in accordance with the present invention. The video encoder 400 includes a video encoding circuit 402, a refresh rate control information generating circuit 403 and a multiplexer 404.

The video encoding circuit 402 encodes uncoded digital video into encoded frames which may be either progressive or interlaced frames. It includes a buffer 405 for delaying the output of the video encoding circuit 402 for a sufficient period of time for rate information generated by circuit 403 to be added at an appropriate point to the generated encoded video data. The video encoding circuit 402 encodes, e.g., compresses, the input video signals by using, e.g., known MPEG video encoding techniques. In addition, it supplies to the information generating circuit 403, information about frame and/or field coding rates and, when available from the input digital video stream, information about the actual image, e.g., frame, capture rate and/or transmission frame rate.

The refresh rate control information generating circuit 403 is responsible for generating rate and/or control information which is not necessary for the decoding of an image but, in accordance with the present invention is to be incorporated into the encoded video bitstream. The rate information generated by the circuit 403 is incorporated into an encoded bitstream as user data in an MPEG-2 embodiment or as metadata in systems which support the use of such data. As will be discussed below, the rate information generated by the information generating circuit 403 is used, in accordance with the present invention, to control the refresh rate of a display device.

The information generating circuit 403 collects the rate information supplied to it from the video encoder and determines over a period of time how long specific rate information is valid. Thus, circuit 403 determines how long the video encoder operates at a particular coded frame or field rate and/or how long the image capture rate remains constant. The rate duration information is incorporated, along with the received rate information, into a set of collected rate information which is supplied to the MUX 404.

The MUX 404 inserts the collected rate information, including the duration information which indicates how long a specified rate will be valid, into the encoded digital video bitstream output by video encoder 400. The rate information is inserted at a point where the rate information is applicable. Thus, the MUX 404 outputs encoded digital video data which includes the rate information generated by information generating circuit 403.

A decoder receiving the encoded rate and duration information can determine if the refresh rate of the display device should be modified or if other frame rate adjustment techniques should be employed if the rate information suggests a display rate that differs from the current frame rate. For short, e.g. under 5 min, frame rate changes, e.g., due to commercials, it may be better to adjust the frame rate using a known repeat technique to match the current display rate than to modify the display rate for such a short period of time.

Figure 5:
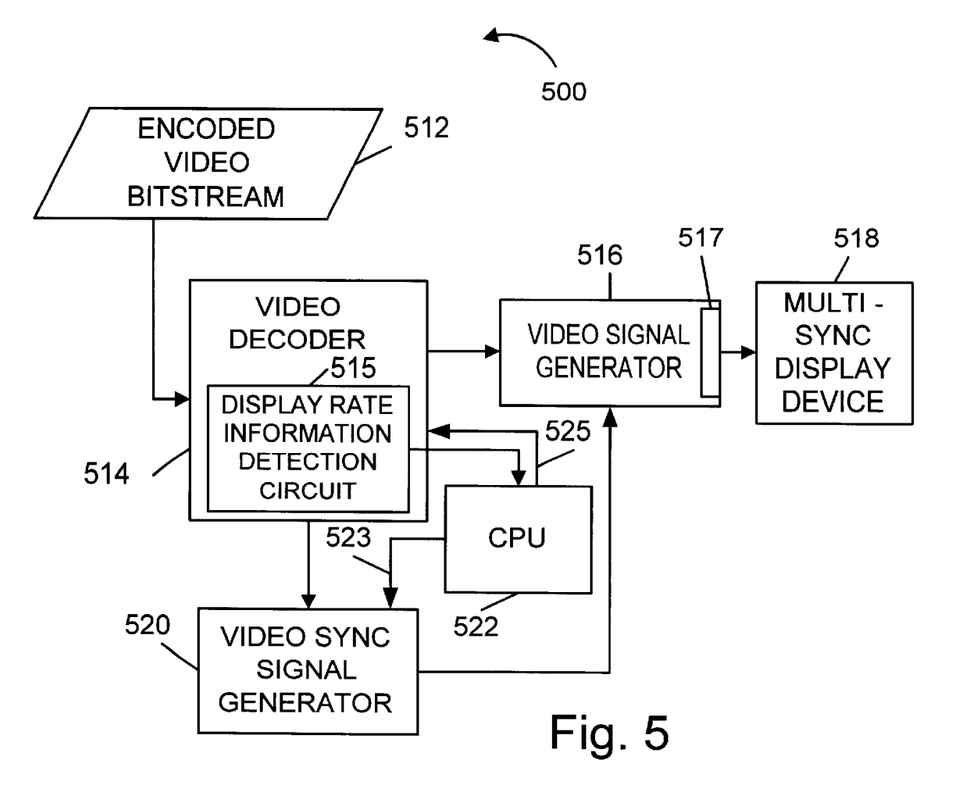
FIG. 5 illustrates a video system for decoding and displaying either progressive or interlaced frames in accordance with the present invention.

FIG. 5 illustrates a video decoding and display system 500 implemented in accordance with one embodiment of the present invention. As illustrated, the system 500 includes a video decoder 514, a CPU 522, a video sync signal generator 520, video signal generator 516 and a multi-sync display device 518. The multi-sync display device is capable of supporting multiple vertical and/or horizontal sync rates and thus multiple refresh rates. While the CPU 522 is shown as being external to the video decoder 514, it may be incorporated directly into the video decoder 514 or video sync signal generator 520.

The video decoder 514 receives as its input an encoded video bitstream 512, representing a sequence of images, e.g., interlaced or progressive frames. The encoded video bitstream may be, e.g., an MPEG-2 bitstream which includes indicated display frame rate information. In accordance with the present invention, the encoded bitstream may also include, e.g., coded frame or field rate information and/or image capture rate information included in accordance with the present invention.

The video decoder 514 decodes the received encoded bitstream 512 and sends timing information extracted from the received bitstream to the video sync signal generator 520. In accordance with the present invention, the video decoder 514 includes a display rate information detection circuit 515. This circuit is responsible for detecting information which may be useful for controlling the frame and/or field output rate of the video decoder 514 and the refresh rate of the display device 518. Information which may be detected by the detection circuit 515 includes the indicated display frame rate, coded frame rate, coded field rate and/or image capture rate information. The detected information, which in accordance with the present invention is used to control the refresh rate and output rate of the video decoder 514, is supplied to the CPU 522.

The CPU 522 as will be discussed below, controls the refresh rate of the multi-sync display device by controlling the rate at which vertical and/or horizontal timing signals are generated by the video sync signal generator. CPU 522 controls the video sync signal generator 520 via commands and/or timing signals transmitted to the video sync signal generator 520 over line 523.

In addition to controlling the generation of the vertical and/or horizontal sync signals, the CPU 522 also controls, via line 525, the field and/or frame output rate of video decoder 514. In one exemplary embodiment, when the CPU 522 controls the output rate of video decoder 514, the CPU 522 instructs the video decoder to ignore repeat field and/or repeat frame instructions included in the original encoded bitstream and respond instead to repeat field and/or repeat frame commands output by the CPU 522.

Video signal generator 516, which includes an interface 517, is the same as, or similar to, the video signal generator 16. Accordingly, its operation will not be described again except to note that the video signal generator 516 may output analog and/or digital video signals. The video signal generator 516 outputs analog video signals when the multi-sync display device is designed to receive analog input signals. However, in embodiments where a multi-sync display device with digital video inputs is used, the video signal generator 516 outputs digital video and digital sync signals.

The multi-sync display device 518 is capable of supporting a range of refresh rates. It is responsive to the video signals, e.g., red, green and blue (R, G, B) video signals in addition to the vertical and/or horizontal sync signals received from the video signal generator 516. In response to the received video and sync signals, the display device 518 displays the decoded video images, e.g., frames, at a refresh rate determined by the sync signals supplied thereto.

Figure 6:
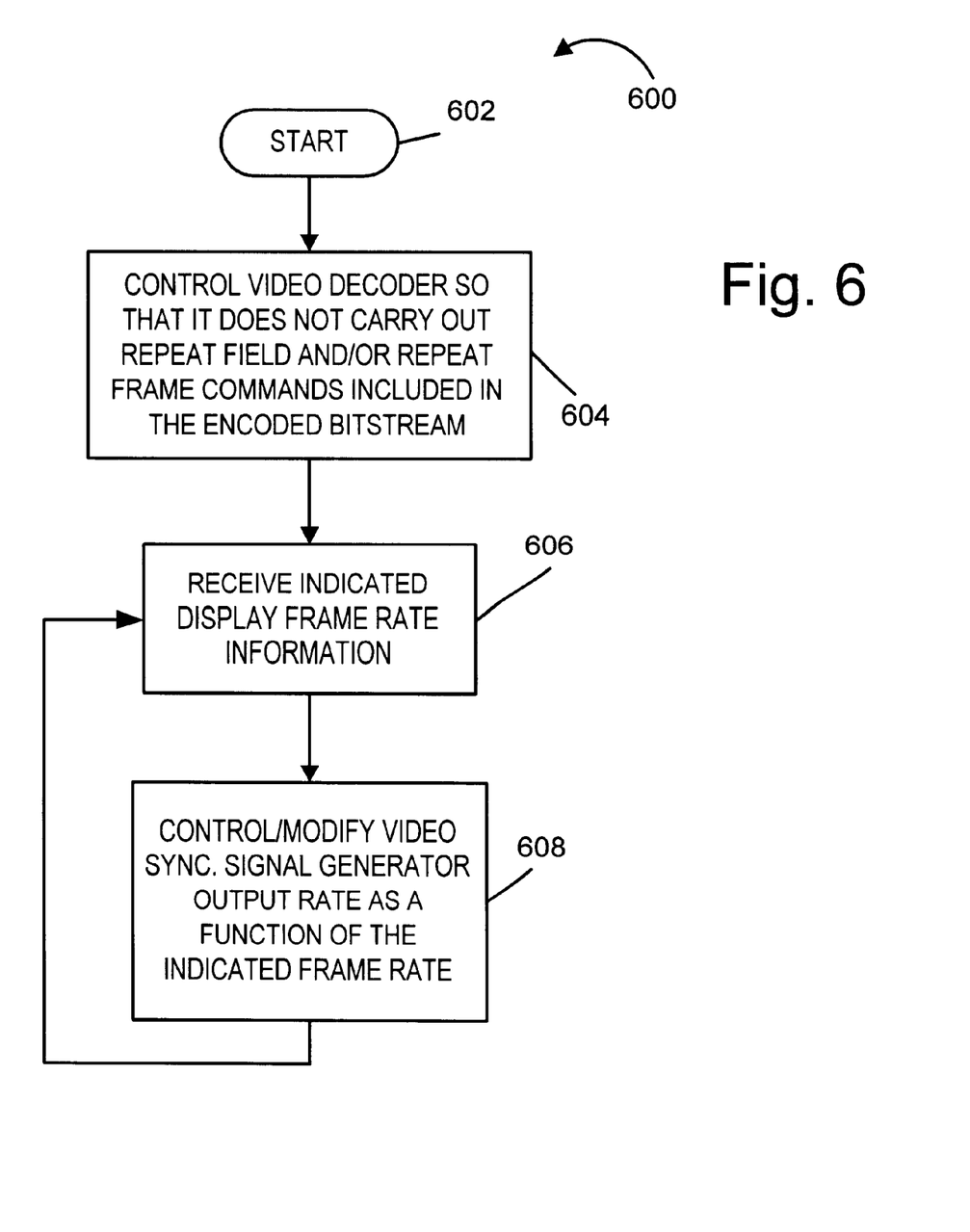
FIG. 6 illustrates a method of generating video sync signals used for controlling the refresh rate of a display device in accordance with a first embodiment of the present invention.

A first exemplary embodiment of the present invention as it relates to the control of a display devices refresh rate will now be described with reference to FIG. 6. FIG. 6 illustrates the steps of a control routine 600 performed by the CPU 522. The routine 600 is used to control the frame and/or field output rate of the video decoder 514 and the sync signal output rate of video sync signal generator 520.

As illustrated, the routine 600 begins in start step 602 wherein the CPU 522 begins executing the control routine. Next, in step 604, the CPU 522 instructs the video decoder not to perform repeat field and/or repeat frame commands included in the encoded video bitstream being processed by the video decoder 514. Then, in step 606, the CPU 522 receives, from the video decoder 514, indicated display frame rate information extracted from the received encoded bitstream. This information may correspond to, e.g., the indicated frame rate currently included in MPEG-2 compliant video bitstreams.

From step 606 operation proceeds to step 608. In step 608, the CPU 522 generates, as a function of the received frame rate information, one or more video sync generator control signals which control the video sync signal generator 520 to output sync signals at a rate which is an integral multiple of the indicated frame rate. In this manner, in the first exemplary embodiment, the refresh rate of the display device is controlled to be a rate which is an integral multiple of the indicated frame rate included in the encoded bitstream. A wide range of integral multiples may be supported with integral multiples 1, 2, 3 and/or 4 being common.

In addition to controlling the video sync signal generator, the CPU 522 controls the video decoder 514. The video decoder 514 is controlled to output frames at an integral multiple of the frame rate which corresponds to the rate at which the display device will be refreshed as a result of the sync signals generated by the video sync generator 520. Repeat frame and/or field commands may be transmitted to the video decoder from the CPU 522 in order to achieve the desired frame output rate.

From step 608 operation proceeds once again to step 606. Accordingly, the CPU 522 will be responsive to changes in the indicated frame rate included in the encoded bitstream and control the video sync signal generator 19 to modify the display device refresh rate as the indicated frame rate changes.

Consider, for example, the case where the indicated frame rate is 24 Hz. In the known system a video decoder coupled to a display device with a 30 Hz fixed refresh rate would pad the 24 Hz signal to form a 30 Hz signal using repeat fields as shown in FIG. 2.

In the system of the present invention, when operating according to the first exemplary embodiment, the refresh rate of display device is controlled to be an integral multiple of the 24 Hz indicated frame rate, e.g., 24, 48 or 72 Hz. When the same system of the present invention received a signal with a different indicated frame rate, e.g., 30 Hz, the refresh rate of the display device would be set to a different refresh rate, e.g., 60 Hz. The refresh rate may be set to different multiples e.g., 2× or 3×, of the indicated frame rate, for different indicated frame rates.

Figure 3:
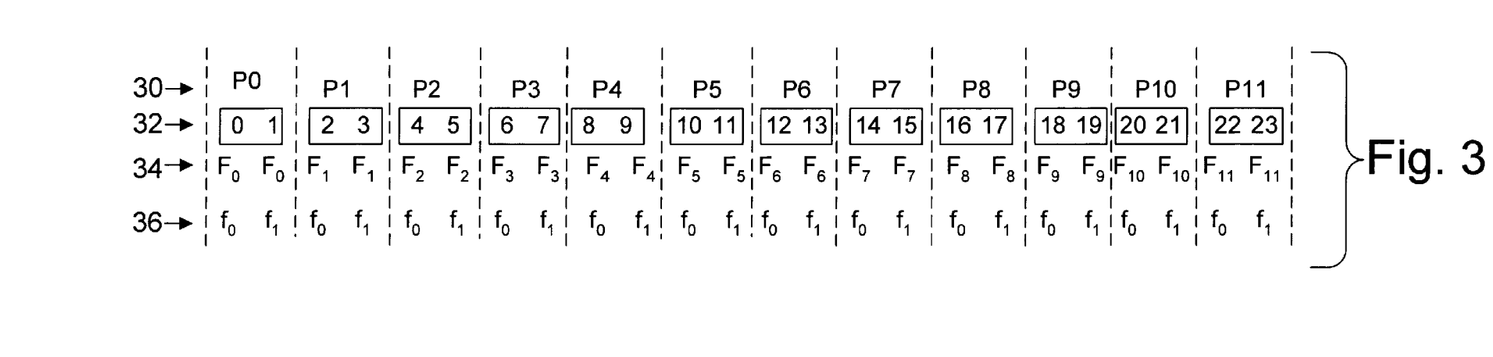
FIG. 3 illustrates a method of representing and displaying a sequence of images in accordance with the present invention.

Application of the present invention can be understood by referring to FIG. 3. In FIG. 3, the first row 30 illustrates 12 film pictures (P0–P11) corresponding to a half second of time. In the second row, identified by reference numeral 32, numbers 0 though 23 are used to indicate the 24 fields which are transmitted, and will be displayed in accordance with the first exemplary embodiment of the present invention, in a half second period of time. A box is used in row 22 to group together fields which correspond to the same film picture. The third and fourth rows of FIG. 3, indicated by reference numerals 34 and 36, illustrate how a received signal with an indicated frame rate of 24 Hz would be output in accordance with the first exemplary embodiment of the present invention, at a 1 times multiple of the indicated frame rate, i.e., at 24 Hz. Note that in FIG. 3, the frames and fields corresponding to a ½ second time interval are shown. As illustrated in row 34 each frame is output only once, e.g., for a time period corresponding to 1/24 of a second. Similarly, row 36 illustrates how each field of a frame is output only once, e.g., for 1/48 of a second. While an output rate of 24 frames per second is illustrated in FIG. 3, other output rates are also possible as discussed above. For example the output rate might be 3×24 72 frames per second and the refresh rate of the display controlled to match the display rate of 72 frames per second which requires the refreshing of 144 fields per second in the case of an interlaced display embodiment. In such an embodiment, each frame would be repeated three times.

However, because each frame and field included therein would be displayed for the same amount of time, motion should appear relatively smooth.

In cases where the indicated frame rate matches the encoded frame rate, the first embodiment of the present invention usually produces superior images to known systems which use the repeat field to pad a decoder output rate to match the refresh rate of a display device having a fixed refresh rate.

Figure 7:
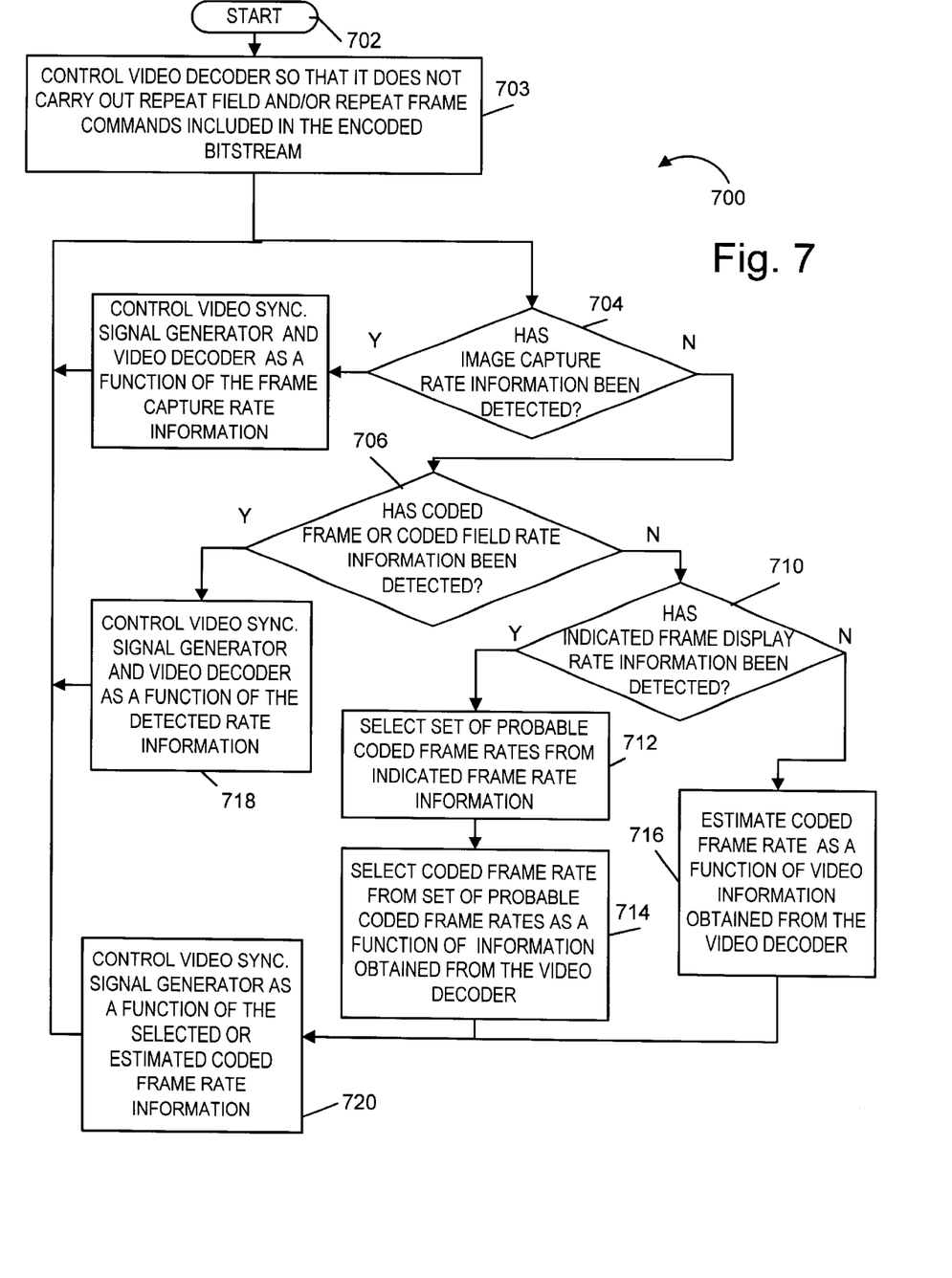
FIG. 7 illustrates a method of generating video sync signals used for controlling the refresh rate of a display device in accordance with a second embodiment of the present invention.

A second exemplary embodiment of the present invention will now be described with regard to the control routine 700 illustrated in FIG. 7. As will be discussed below, the control routine 700 uses, when present, coded frame, coded field or image capture rate information included in the encoded video bitstream. In addition to, or in the absence of such metadata, the control routine uses frame or field decoding rate information to control the refresh rate of a display. The metadata and/or decoding rate information is obtained by the CPU 522 and used to determine an accurate value for the image capture rate or, in the absence of sufficient information to do that, an accurate value for the coded frame or field rate. Using one of these values, the refresh rate of the display device 518 and the frame output rate of the video decoder 514 are controlled to be an integral multiple of the determined image capture rate, coded frame rate, or coded field rate.

Operation of the CPU 522 under control of routine 700 will now be discussed in detail. As illustrated in FIG. 7, routine 700 beings with start step 702 wherein the routine 700 begins being executed by CPU 522. Next, in step 703, the CPU 522 controls the video decoder 514 so that it does not carry out repeat field and/or repeat frame commands included in the encoded bitstream which is being decoded. The control of the video decoder is carried out by sending a command from the CPU 522 to the decoder 514 via line 525.

As discussed above, the display rate information detection circuit 515 in the video decoder 514, detects capture rate information, indicated display frame rate information, coded frame rate information and/or coded field rate information which is included in the encoded video bitstream 512. In addition the detection circuit 514, operates to detect the rate at which frames and/or fields are decoded. These rates are referred to herein as the decoding frame rate and the decoding field rate, respectively. The display rate information detection circuit 515 also, in some embodiments, detects the occurrence of repeat field and repeat frame commands found in the encoded bitstream.

The rate information and the information on the occurrences of the repeat field and/or repeat frame commands included in the encoded bitstream, detected by the display rate information detection circuit 515 is supplied to the CPU 522. Accordingly, the CPU 522 can, from the information supplied to it, determine when various types of rate information have been received in the encoded video bitstream 512.

Referring once again to FIG. 7, operation proceeds from step 703 to step 704 wherein a check is made to determine if image capture rate information has been detected by the detection circuit 515. If image capture rate information has been detected in the received bitstream, operation proceeds to step 705. In step 705, in accordance with the present invention, the CPU 522 controls the video sync signal generator and video decoder as a function of the detected frame capture rate information. That is, the frame output rate of the decoder 514 is controlled to be an integer multiple of the detected image capture rate and the video sync signal generator 520 is controlled so that the refresh rate of the multi-sync display device matches the output rate of the video decoder 514.

If in step 704, it is determined that image capture rate information was not detected in the encoded bitstream, e.g., because metadata providing such information was not included in the bitstream, operation proceeds to step 706.

In step 706, a determination is made as to whether or not coded frame or coded field rate information was detected in the encoded bitstream 512. If coded frame or coded field rate information is detected in the received bitstream, operation proceeds to step 718 wherein, in accordance with the present invention, the CPU 522 controls the video sync signal generator and video decoder as a function of the detected coded frame or coded field rate information. The coded frame rate is determined from the coded field rate information when such information is detected. In accordance with the present invention the frame output rate of the decoder 514 is controlled to be an integer multiple of the coded frame rate and the video sync signal generator 520 is controlled by the CPU 522 so that the refresh rate of the multi-sync display device matches the output rate of the video decoder 514.

If in step 706, it is determined that coded frame or coded field rate information was not detected in the encoded bitstream, e.g., because metadata providing such information was not included in the bitstream, operation proceeds to step 710. In step 710 a determination is made as to whether or not indicated display frame rate information was detected in the bitstream 512. If indicated display frame rate information is not detected in the bitstream being decoded, operation proceeds to step 716. In step 716, an estimate of the coded frame rate is made based on information obtained by decoding the encoded bitstream, e.g., information on the number of frames decoded in a given or per-selected period of time is used to determine the coded frame rate. Operation proceeds from step 716 to step 720.

Operation proceeds from step 710 to step 712 if indicated frame display rate information is detected in the encoded bitstream 512. A plurality of frame display rates are commonly used in modern video systems. A first group of common display rates involve the display of non-integer numbers of frames per second. The first group includes frame display rates of: 23.976, 29.97, 59.94 HZ. A second group of common display rates includes only display rates which involve the display of an integer number of frames per second. The second group of common frame display rates includes display rates of: 24, 30 and 60 Hz.

In step 712, the indicated display frame rate is used to select the one of two coded frame rate sets that is more likely to include the actual coded frame rate value. If the indicated frame display rate information indicates a non-integer number of frames to be displayed in a second, the first group of frame display rates is selected as the group which is most likely to include the actual coded frame rate. However, if the indicated frame display rate information indicates an integer number of frames to be displayed in a second, the second group of frame display rates is selected as the group which is most likely to include the actual coded frame rate.

After one of the groups of possible coded frame rates is selected in step 712, operation proceeds to step 714. In step 714 the coded frame rate to be used in controlling decoder output and display device refresh rates is selected from within the set of probable coded frame rates selected in step 712. The selection of the coded frame rate is based on the number of frames decoded in a second or the indicated frame display rate and the number of frame and/or field repeat commands which are detected per second. In the case where the coded frame rate is derived from the indicated frame display rate and the field or frame repeat rate, the coded frame rate is derived by subtracting from the indicated frame rate the number of frames per second which are attributable to repeated frames or fields. Once the coded frame rate is determined via the selection operation performed in step 714, operation proceeds to step 720.

In step 720 the CPU 522 controls the video sync signal generator 520 and video decoder 514 as a function of the estimated or selected coded frame rate. That is, the frame output rate of the decoder 514 is controlled to be an integer multiple of the estimated or selected coded frame rate and the video sync signal generator is controlled so that the refresh rate of the multi-sync display device matches the frame output rate of the video decoder 514.

Operation proceeds from step 705, 718 and 720 to step 704 which marks the beginning of the repeating of the various steps which are used to control the decoder output rate and the display refresh rate in accordance with the present invention.

By controlling the refresh rate of a display device and the frame output rate of a video decoder in the above described manner, motion in a video sequence can be displayed in a relatively smooth manner.

The methods and apparatus of the present invention are well suited for use in video encoders and video decoders. They are particularly well suited for use in integrated receiver decoders (IRDs) with multi-format video signal outputs, in digital media player such ad digital video disk (DVD) players with multi-format signal outputs, and in integrated decoding/display products such as cathode ray tube (CRT) based television receivers with integrated digital video decoders. Additional devices which may incorporate the methods and apparatus of the present invention will be apparent to those skilled in the art in view of the above description of the invention.

What is claimed is:

1. A display method comprising the steps of:
   receiving a bitstream including encoded video data; and
   controlling a refresh rate of a multi-sync display device, as a function of information, other than an indicated field or frame display rate, included in said bitstream, when displaying video images represented by said encoded video data on said multi-sync display device.

2. A display method comprising the steps of:
   receiving a bitstream including encoded video data; and
   controlling a refresh rate of a multi-sync display device, as a function of information included in said bitstream, when displaying video images represented by said encoded video data on said multi-sync display device;
   wherein said information included in the bitstream is display device refresh rate control information which indicates a rate which can be used to control the refresh rate of a display device; and
   wherein the step of controlling a refresh rate of a multi-sync display device includes the act of:
      controlling a video synchronization signal generator to generate vertical display synchronization signals at a rate which is an integer multiple of a rate indicated by said display device refresh rate control information, the integer multiple being a multiple greater than one.

3. The method of claim 2, wherein the integer multiple is three.

4. The display method of claim 2,
   wherein said refresh rate control information further includes duration information associated with a rate included in the refresh rate control information, the duration information indicating the period of time for which the associated rate indicated by the refresh rate control information is valid.

5. The display method of claim 4,
   wherein the step of controlling a video synchronization signal generator includes the act of:
      changing the rate at which vertical display synchronization signals are generated as a function of a new rate indicated by said display device refresh rate control information, when the duration information indicates that the new rate is valid for a time period greater than one minute but not when the duration information indicates that the new rate is valid for a time period less than one minute.

6. The display method of claim 2, wherein the step of controlling a refresh rate of a multi-sync display device includes the act of;
   selecting, based on said information included in the bitstream, one of a plurality of possible refresh rates to be used as said refresh rate of the multi-sync display device.

7. The method of claim 6,
   wherein said information included in the bitstream is an indicated frame display rate; and
   wherein the act of selecting a refresh rate to be used includes the act of selecting a refresh rate which is an integer multiple of the indicated frame rate.

8. The method of claim 7, wherein the integer multiple is three.

9. The method of claim 7, wherein the integer multiple is one of the elements in the group of integer multiples consisting of two, three and four.

10. The method of claim 1, wherein said information included in the bitstream is an image capture rate, and
    wherein the act of selecting a refresh rate to be used includes the act of selecting a refresh rate which is an integer multiple of the image capture rate.

11. The method of claim 10, wherein the integer multiple is one of the elements in the group of integer multiples consisting of one, two, three and four.

12. The method of claim 1, wherein said information included in the bitstream is a coded frame rate, and
    wherein the act of selecting a refresh rate to be used includes the act of selecting a refresh rate which is an integer multiple of the coded frame rate.

13. The method of claim 12, wherein the integer multiple is one of the elements in the group of integer multiples consisting of one, two, three and four.

14. The method of claim 1, wherein said information included in the encoded video data is a coded field rate, and
    wherein the act of selecting a refresh rate to be used includes the act of selecting a refresh rate which is an integer multiple of the coded field rate.

15. The method of claim 14, wherein the integer multiple is one of the elements in the group of integer multiples consisting of one, two, three and four.

16. A display method comprising the steps of:
    receiving a bitstream including encoded video data; and
    controlling a refresh rate of a multi-sync display device, as a function of information included in said bitstream, when displaying video images represented by said encoded video data on said multi-sync display device;

wherein said information included in the encoded video bitstream includes an indicated frame display rate and field repeat instructions; and wherein the act of selecting a refresh rate to be used includes the act of:

determining the coded frame rate from the indicated frame display rate and the field repeat instructions; and wherein the act of selecting a refresh rate to be used includes the act of selecting a refresh rate which is an integer multiple of the determined coded frame rate.

17. The method of claim 16, further comprising the step of:

controlling a video decoder decoding said encoded video data to disregard repeat field commands included in the encoded video data.

18. The method of claim 17, wherein the step of controlling a refresh rate of a multi-sync display device includes the acts of:

generating vertical synchronization signals at the selected refresh rate; and supplying the synchronization signals to the multi-sync display device.

19. The method of claim 18, further comprising the step of:

controlling the video decoder to output video frames at a rate corresponding to the refresh rate of the multi-sync display device.

20. A method of displaying images on a multi-sync display device, the method comprising the steps of;

receiving a bitstream including encoded video data representing a series of images and frame rate information;

generating display device refresh control signals at a first rate when the frame rate information indicates a first frame rate, the first rate being an integer multiple greater than one of the encoded frame rate information; and generating display device refresh control signals at a second rate when the frame rate information indicates a second frame rate, the second rate being different from the first rate.

21. A method of displaying images on a multi-sync display device, the method comprising the steps of:

receiving a bitstream including encoded video data representing a series of images and frame rate information;

generating display device refresh control signals at a first rate when the frame rate information indicates a first frame rate;

generating display device refresh control signals at a second rate when the frame rate information indicates a second frame rate, the second rate being different from the first rate; and operating a video decoder to decode the encoded video data, the step of operating a video decoder including the act of:

controlling the video decoder to ignore at least one repeat field instruction included in the received encoded video data.

22. The method of claim 20, wherein the first and second rates are integer multiples of the frame rate indicated by the frame rate information.

23. A method of displaying images on a multi-sync display device, the method comprising the steps of;

receiving a bitstream including encoded video data representing a series of images and frame rate information;

generating display device refresh control signals at a first rate when the frame rate information indicates a first frame rate; and generating display device refresh control signals at a second rate when the frame rate information indicates a second frame rate, the second rate being different from the first rate;

wherein the frame rate information indicates a rate from the group of rates consisting of: a coded frame rate, a capture frame rate and a transmission frame rate.

24. The method of claim 23, wherein the capture frame rate indicates the number of frames which are generated from a physical scene in a pre-selected period of time and wherein the transmission frame rate indicates the number of frames transmitted in a pre-selected period of time.

25. The method of claim 23, wherein the step of generating display device refresh control signals includes the step of:

generating horizontal and vertical synchronization signals.

26. A method of decoding and displaying video frames, comprising the steps of:

receiving encoded video data representing a plurality of frames;

operating a decoder to decode the encoded video data and to generate decoding rate information and decoded image data; and controlling the refresh rate of a display device as a function of the decoding rate information generated by said decoder; and supplying the decoded image data to the display device.

27. The method of claim 26, wherein the decoding rate information includes information about the rate at which frames are decoded; and wherein the step of controlling the refresh rate of the display device includes the act of:

generating vertical synchronization signals at a rate which is an integer multiple of the rate at which frames are decoded.

28. The method of claim 27, further comprising the step of:

controlling the video decoder to ignore repeat field instructions included in the encoded video data which is decoded.

29. A method of encoding data representing a series of images, comprising the steps of:

performing a digital encoding operation on the data representing the series of images to generate a first bitstream including encoded frames and frame display rate information;

generating display device refresh rate control information; and combining the display device refresh rate control information with the data included in the first bitstream to generate a second bitstream including encoded frames and display device refresh rate control information.

30. The method of claim 29, wherein the display device refresh rate control information includes coded frame rate information and the period for which the coded frame rate is valid.

31. A method of encoding data representing a series of images, comprising the steps of:

performing a digital encoding operation on the data representing the series of images to generate a first bitstream including encoded frames;

generating display device refresh rate control information; and combining the display device refresh rate control information with the data included in the first bitstream to generate a second bitstream including encoded frames and display device refresh rate control information;

transmitting the second coded bitstream to a display system; and operating the display system to perform the steps of:
  decoding the encoded frames; and
  controlling the refresh rate of a multi-sync display device included in said display system as a function of the refresh rate control information included in the second bitstream.

32. The method of claim 31, wherein the step of controlling the refresh rate of a multi-sync display device includes the step of adjusting the refresh rate of the display device in response to a change in rate information included in the refresh rate control information.

33. The method of claim 32, wherein the refresh rate control information includes duration information which indicates a period during which a specified rate is valid, the step of controlling the refresh rate of the multi-sync display device including the step of ignoring for purposes of adjusting the refresh rate, rate information which is indicated to be valid for less than one minute.

34. The method of claim 29, wherein the refresh rate control information includes image capture rate information.

35. The method of claim 34, wherein the refresh rate control information includes coded field rate information.

36. A video encoder, comprising:
  a video encoding circuit for generating encoded video data including frame display rate information;
  a refresh rate control information generating circuit coupled to the video encoding circuit for generating information about a rate to be used for controlling the refresh rate of a display device used to display images represented by the generated encoded video data, the information generated by said refresh rate control generating circuit being in addition to the frame display rate information generated by said video encoding circuit.

37. The video encoder of claim 36, wherein the refresh rate control information includes coded frame rate information indicating the rate at which frames are coded by the video encoding circuit.

38. The video encoder of claim 37, wherein the encoding rate information also includes information about the amount of time the indicated coded frame rate is valid.

39. The video encoder of claim 38, wherein the video encoding circuit is an MPEG-2 video encoder which incorporates a frame display rate indicator into the encoded video data.

40. The video encoder of claim 36, wherein the refresh rate control information includes image capture rate information.

41. The video encoder of claim 36, wherein the refresh rate control information includes coded field rate information.

42. A video display system, comprising:
  a video decoder for decoding encoded video data including display rate information;
  a video synchronization signal generator coupled to the video decoder for generating display device synchronization signals;
  a control circuit coupled to the video decoder and the video synchronization signal generator for determining a refresh rate which differs from a display rate indicated by the encoded video data, to be used for displaying decoded video images as a function of information obtained from the video decoder; and
  a multi-sync display device capable of supporting a plurality of screen refresh rates coupled to is the video decoder and the video synchronization signal generator.

43. The display system of claim 42, wherein the control circuit includes a processor executing a refresh rate control routine.

44. The display system of claim 42, wherein the control circuit includes means for instructing the video decoder not to perform field repeat commands included in encoded video that is being decoded.

45. An apparatus comprising:
  a decoder module for decoding encoded video data; and
  a refresh rate control module coupled to said decoder module for generating a display device refresh rate control signal as a function of information, other than an indicated field or frame display rate, included in said encoded video data.

* * * * *